United States Patent [19]

Voll

[11] 4,385,258
[45] May 24, 1983

[54] DELAY CIRCUIT FOR INTERIOR ILLUMINATION MEANS OF A MOTOR VEHICLE

[76] Inventor: Walter Voll, Nikolaus-Fey-Strasse 2, 8728 Hassfurt, Fed. Rep. of Germany

[21] Appl. No.: 178,066

[22] Filed: Aug. 14, 1980

Related U.S. Application Data

[63] Continuation of Ser. No. 46,964, Jun. 8, 1979, abandoned.

[30] Foreign Application Priority Data

Jun. 21, 1978 [DE] Fed. Rep. of Germany ....... 2827117
Oct. 27, 1978 [DE] Fed. Rep. of Germany ....... 2846751
Oct. 27, 1978 [DE] Fed. Rep. of Germany ....... 2846752

[51] Int. Cl.³ .............................................. B60Q 7/00
[52] U.S. Cl. ................... 315/84; 307/10 LS; 315/77
[58] Field of Search ............... 315/77, 84, 74; 307/10 LS; 362/74, 80

[56] References Cited

U.S. PATENT DOCUMENTS

| | | | |
|---|---|---|---|
| 3,221,211 | 11/1965 | Murphy et al. | 315/84 |
| 3,626,239 | 12/1971 | Brock | 307/10 LS |
| 4,071,805 | 1/1978 | Brock | 315/84 |
| 4,115,723 | 9/1978 | Byrne et al. | 315/84 |
| 4,122,371 | 10/1978 | Talmage et al. | 315/84 |
| 4,123,668 | 10/1978 | Pecota | 315/84 |

FOREIGN PATENT DOCUMENTS

| | | | |
|---|---|---|---|
| 2414676 | 2/1975 | Fed. Rep. of Germany | 315/84 |
| 2810659 | 9/1979 | Fed. Rep. of Germany | 315/84 |
| 2819913 | 11/1979 | Fed. Rep. of Germany | 315/84 |
| 2346933 | 1/1977 | France | 315/84 |

OTHER PUBLICATIONS

"Delay Circuits Keep Headlights On when Needed, Turn Them Off if You Forget," by J. Okolowicz, Patent Associated Literature, E 140-7620-11, vol. 24, No. 18, p. 114, Sep. 1, 1976.

Primary Examiner—Saxfield Chatmon, Jr.
Attorney, Agent, or Firm—Sughrue, Mion, Zinn, Macpeak and Seas

[57] ABSTRACT

A delay circuit for the interior light of a motor vehicle and adapted to be actuated by a vehicle door contacts connected in series with the interior light is disclosed. The circuit has an R.C. network for determining a time delay between opening the door contacts and extinguishing the interior light, an electronic switching amplifier arranged to be connected in series with the interior light and arranged to be switched by the R.C. network, a discriminator stage having a threshold voltage and through which the electronic switching amplifier is arranged to be switched by the R-C network, elements to connect the R-C network and the electronic amplifier in parallel with the door contacts, and elements to provide a residual voltage which is applied across the electronic switching amplifier on opening the door contacts and which charge the capacitor of the R-C network. The residual voltage is greater than the threshold voltage of the discriminator stage and is so low that a voltage difference between the voltage of a source of electricity and the residual voltage is sufficient to operate the interior light.

9 Claims, 7 Drawing Figures

DELAY CIRCUIT FOR INTERIOR ILLUMINATION MEANS OF A MOTOR VEHICLE

This is a continuation of application Ser. No. 46,964, filed June 8, 1979, now abandoned.

BACKGROUND OF THE INVENTION

The present invention relates to a delay circuit for an interior light of a motor vehicle.

The circuit of the interior light of a motor vehicle is usually so designed that it extinguishes immediately when door contacts associated with the doors of the motor vehicle are opened. This has the consequence that the driver finds himself in darkness after getting into the vehicle as well as when the driver leaves the vehicle.

To avoid this deficiency, a delay circuit is disclosed in U.S. Pat. No. 3,221,211. In this disclosure a set of door contacts, through a monostable multivibrator, switches a light source which continues to light for some time after the opening of the motor vehicle door. The circuit disclosed in U.S. Pat. No. 3,221,211 is not readily suitable for application to the circuit, usually provided in a motor vehicle, of the interior light. Either the wiring of the existing light would have to be changed, while the usual function thereof would then be lost, or an additional light would have to be provided.

U.S. Pat. No. 4,071,805 discloses a delay circuit for the interior light of a motor vehicle, in which delayed switching-off of the light after closing of a set of door contacts is attained by means of a series connection of the door contacts, a switching amplifier and a relay winding, the delay time being provided by a resistance-capacitance network in parallel with the switching amplifier, and the relay winding actuates a switch parallel to the door contacts. Apart from the fact that the use of a relay makes the circuit expensive, it is a disadvantage in the case of U.S. Pat. No. 4,071,805 circuit must be connected to at least three poles of the vehicle power supply.

U.S. Pat. No. 3,916,250 discloses a delay circuit for the interior light of a motor vehicle, in which the delay function is initiated not by means of their door contacts, but by means of additional contacts mounted at the handle of the vehicle door. This enables the interior illumination to be switched on before getting into the vehicle. This circuit also operates with a relay and requires three connections as well as the additional switching contacts.

OBJECTS OF THE INVENTION

It is an object of the invention to provide a delay circuit which does not impair the usual function of the mass-produced interior light circuits provided in motor vehicles and which requires only one connecting conductor and one earth connection for the control of the delay.

SUMMARY OF THE INVENTION

According to the present invention there is provided a delay circuit for a motor vehicle interior light which is connected to a source of electricity of such vehicle and adapted to be actuated by a set of vehicle door contacts having a fixed terminal and a movable terminal and connected in series with said light, said circuit comprising, (a) a first conductor adapted to be connected to said movable terminal of said door contacts,
(b) a second conductor adapted to be connected to said fixed terminal of said door contacts,
(c) a resistance-capacitance network connected between said first and second conductors for determining a time delay between opening said door contacts and extinguishing said light,
(d) discriminator stage means of defined threshold voltage and having input means connected to said network,
(e) electronic switching amplifier means arranged to be connected through said first and second conductors in series with said light and having input means coupled to output means of said discriminator stage means, and
(f) conductor means to apply the residual voltage across said electronic switching amplifier means, when conductive, to said capacitance of said network, wherein said residual voltage is greater than said threshold voltage of said discriminator stage means and is so low that the remaining difference between the voltage of said source of electricity and said residual voltage is sufficient to operate said light.

The light lights up on the closing of a door contact, i.e. on opening of the door. On subsequent closing of the door, the contacts are opened. The light does not, however, extinguish at once since current flows through it by way of the switching amplifier means. At the same time, the capacitance charged by the residual voltage decaying at the switching amplifier means. As soon as the switching voltage of the discriminator stage means is attained, the switching amplifier means is blocked. The light now extinguishes. The light continues to light for a certain time, for example ten seconds, after the closing of the motor vehicle door. The driver can thus perform operations necessary after getting-in, such as for example the insertion of the ignition key and fastening of the safety belt, in light without having manually to switch on the interior light for this. After leaving the motor vehicle, the driver can orientate himself in the surroundings of the motor vehicle, for example to find the light switch of a garage light in a dark garage or to open the boot lock of the motor vehicle.

The delay circuit may be connected at one pole thereof with the interior light or one of the door contacts and at the other pole thereof to earth. Through this simple method of installation, the delay circuit is suitable for the initial equipment as well as the later equipment of a motor vehicle.

Also an individual delay circuit need not be provided for each door, as a single delay circuit can react in like manner to all door contacts.

The delay circuit may be built up as small component unit which can be cast into a synthetic resin so as to provide a space-efficient, corrosion-resistant fitting.

One of the connections of the delay circuit may be an earth pole which is constructed as a fixed contact piece on a housing receiving the delay circuit. Thereby, the delay circuit may be fastened and earthed by only one screw on the motor vehicle. For the complete electrical connection, merely a single conductor need be connected with that one of the door contacts which is connected to the interior light and remote from the earth pole.

A diode, through which the capacitance may discharge on the closing of the door contacts, may be connected between the door contacts and the voltage pole of the capacitance. The capacitance can discharge rapidly through the diode so that the door does not have to be kept open for any length of time. If the diode is not provided, then the capacitance discharges with the door contacts closed, i.e. the door opened, through the resistor of the resistance-capacitance network. In this case, the door must remain open for a certain time, for example 20 seconds, for discharge of the capacitance.

A Zener diode, the Zener voltage of which is greater than the residual voltage of the switching amplifier but smaller than the battery voltage, is connected in parallel with the resistor of the network. Significant advantages of this arrangement are:

(a) If the interior light has a short circuit or the circuit is faultily incorporated in the motor vehicle, then the capacitance is charged through the Zener diode and the switching amplifier means correspondingly blocked so that no current, which would destroy it, can flow therethrough.

(b) In the normal operational case, the switching amplifier means switches through only when the light lights up so that the switching amplifier need be designed only for that resistance value which is present in the case of a warm incandescent lamp of the interior light. When connecting the delay circuit for the first time to the motor vehicle battery or during fitting of the motor vehicle battery, the switching amplifier means must switch the light in cold state, in which case the value of resistance of the light is substantially lower than in the warm state. The switching amplifier means would thus have to be designed for a correspondingly high current. The Zener diode also in this case leads to a very rapid charging of the capacitance so that the switching amplifier means is quickly switched off.

(c) After expiry of the delay time, the switching amplifier means switches the light off. The switching-off process is substantially accelerated by the Zener diode so that the loss loading of the switching amplifier means is correspondingly reduced.

(d) The Zener diode also suppresses voltage peaks, especially positive voltage peaks, whereby the electronic circuit parts are protected.

The delay circuit may be so constructed that it can detect the switching states of further switches, especially for external lights, of the motor vehicle and process these for alarm indication when detecting an external light which has been left switched on. This may be provided by a third circuit connection which is connected to the junction between a light switch contact of the motor vehicle and the light associated therewith, with a signal transmitter being connected in series with the switching path of an electronic switch which is controlled through the third circuit connection and is between the first circuit connection at the interior light and the third circuit connection. When one of the door contacts of the motor vehicle is closed through the opening of a door and the light switch contacts are closed, i.e. the associated external light of the vehicle lights up, the signal transmitter delivers a signal, for example an alarm tone, and the interior light lights up. After closing the door, the current circuit of the signal transmitter is interrupted, the interior light remaining on for a certain time.

The closed state of a light switch contact at a third circuit connection need not cause the interior light to remain on. Further lighting of the interior light is undesired when the exterior lighting is on, as at night it is not desirable to drive with the interior light on. For this, a circuit branch with a resistor and a diode, through which the charging capacitance is to be charged, may be connected between the third circuit connection and the charging capacitance of the network.

The device may have a fourth circuit connection which is to be connected to the ignition lock of the motor vehicle. A further electronic switch is connected between the fourth and the first circuit connection so as to be controlled through the fourth circuit connection and to control the other electronic switch. Thereby, the signal transmitter is switched on only when the ignition lock is switched off. A special contact on the ignition lock is not necessary for this.

Only a single device need be provided for the mentioned switching functions. The entire electronic circuit may be accommodated on a single circuit board with few connections. This leads to savings in the manufacturing costs as well as in costs for installation of the device.

BRIEF DESCRIPTION OF THE DRAWINGS

Embodiments of the present invention will now be more particularly described by way of example and with reference to the accompanying drawings in which.

DESCRIPTION OF THE PREFERRED EMBODIMENTS

Figure 2:
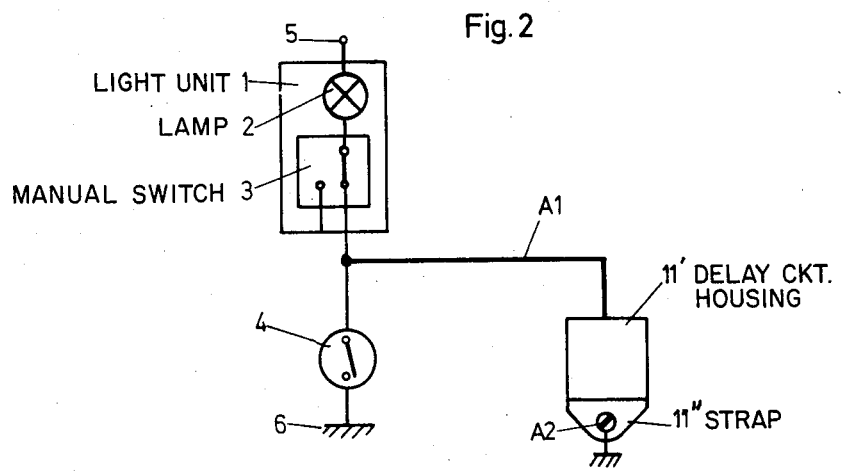
FIG. 2 shows an assembly diagram of the delay circuit.

In a motor vehicle, an interior light unit 1 usually comprises a light 2, in the form of an incandescent lamp, and a manual switch 3 connected in series with each of a plurality of sets of door contacts 4, of which only one is illustrated in the drawings. The light 2 is connected to at the voltage pole 5 of the battery. The door contacts 4 are connected to the earth pole 6 formed by the chassis. As long as a door is closed, the associated set of door contacts 4 are open and vice versa. Connected in parallel with the set of door contacts 4 or the sets of door contacts is a delay circuit 11 accommodated in a housing 11' (cf. FIG. 2) or cast into a block. A circuit connection A1 and a further connection A2 are provided. The connection A1 is connected through a conductor with one pole of the door contacts. The connection A2 can be connected with the earth pole through a strap 11", which serves for the mechanical fastening of the housing 11' to the vehicle chassis (cf. FIG. 2)

Figure 1:
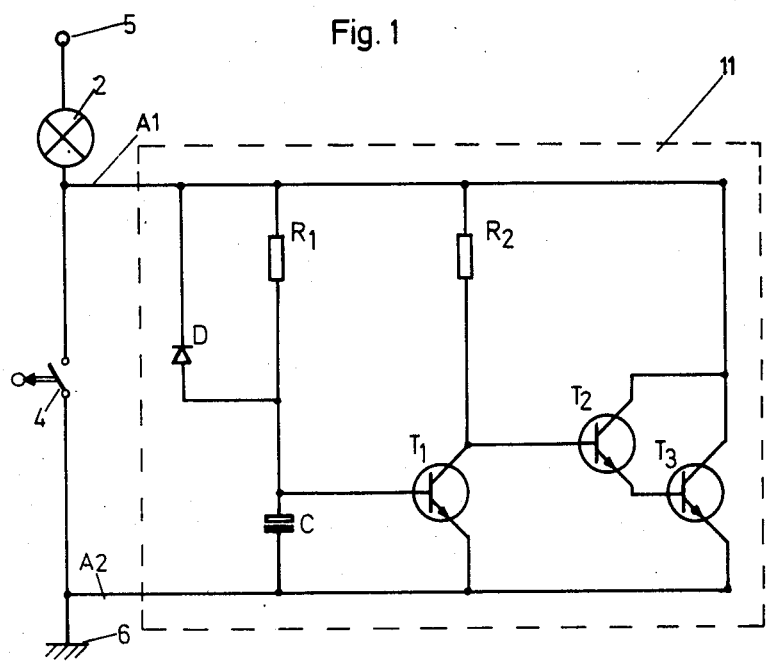
FIG. 1 shows a circuit diagram of a delay circuit for the interior illumination of a motor vehicle.
Figure 4:
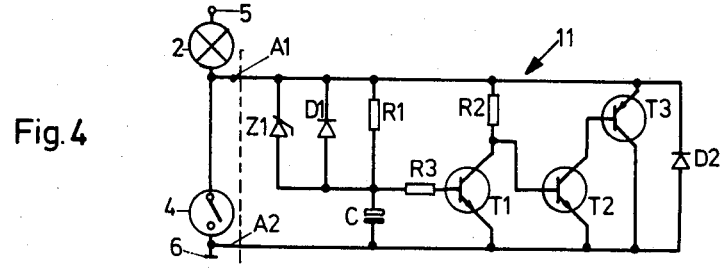
FIG. 4 shows a circuit diagram corresponding to FIG. 3, with a different switching amplifier.
Figure 5:
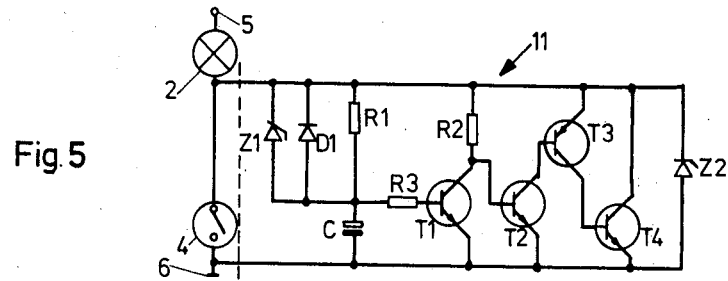
FIG. 5 shows a further embodiment.
Figure 6:
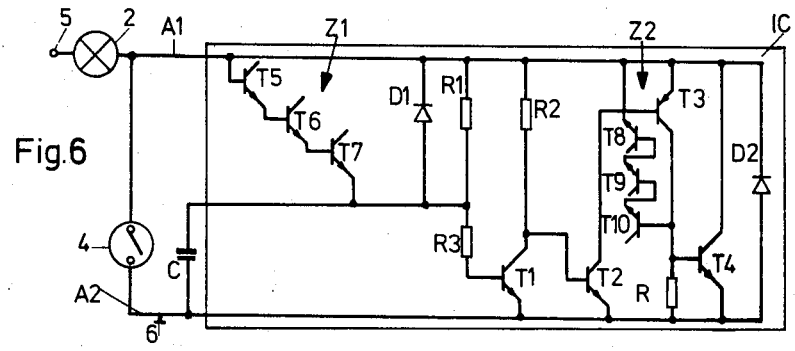
FIG. 6 shows the circuit shown in FIG. 5 as an integrated circuit.
Figure 7:
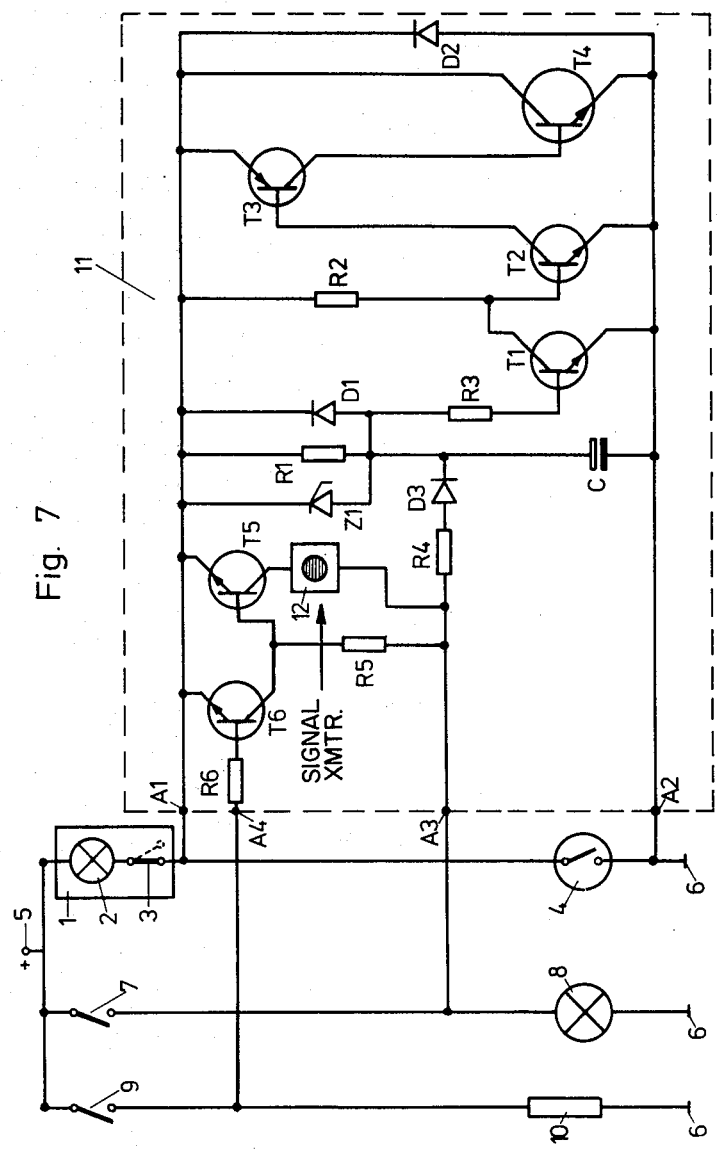
FIG. 7 shows a still further circuit diagram provided with alarm equipment.

The delay circuit 11 has an RC-member comprising a resistor R1 and a capacitor C parallel to the door contacts 4. The base of a transistor T1 which operates as a discriminator stage is at the voltage pole and is connected between the resistor R1 and the capacitor C. The collector-emitter path of the transistor T1 is connected in series with a resistor R2 and in parallel with the door contacts 4. Connected to the collector of the transistor T1 is a control input of a switching amplifier comprising transistors T2 and T3 (FIGS. 1, 3 and 4) or T2, T3 and T4 (FIGS. 5, 6 and 7). The transistors T2 and T3 are connected in a Darlington circuit in the embodiment shown in FIGS. 1 and 3. The collector-emitter path of the transistor T3 or T4 forming the output of the switching amplifier and, in the embodiments shown in FIGS. 3, 4, 6 and 7, a diode D2 or, in the embodiments shown in FIGS. 5 and 6, a Zener diode Z2 are parallel with the door contacts 4.

A diode D (FIG. 1) or D1 (FIGS. 3 to 7) is disposed between the voltage pole of the capacitor C and the door contacts 4. A Zener diode Z1 is parallel with the diode D1 in the embodiments shown in FIGS. 3 to 7.

The delay circuit operates as follows:

As soon as the door contacts 4 are closed through opening of the door, the light 2 lights up. The capacitor C can discharge through the diode D1 and the closed door contacts 4. The transistor T1 is blocked.

When the door contacts 4 are subsequently opened through closing of the door, then a control current flows through the high value resistor R2 and switches the transistors T2 and T3 or T2, T3 and T4 to be conductive so that the light 2 stays on. A residual voltage of, for example, about 1 to 1.6 volts is at the collector-emitter path of the transistor T3 or T4. Since this voltage is parallel with the RC-member, the capacitor C is charged up. As soon as the switching voltage of the transistor T1 is attained at the capacitor C, it becomes conductive. This has the consequence that the transistors T2 and T3 block so that the current flowing through the light is now interrupted. This extinguishes the light 2. The delay time between the opening of the door contacts and the extinguishing of the light 2 is determined particularly by the dimensions of the resistor R1 and the capacitor C. The delay can for example amount to 10 seconds. The capacitor C can be small, since it does not have to store the energy necessary during the time delay for the operation of the light source.

As long as the door contacts 4 remain open, the capacitor C is kept charged. A residual current can now flow through the resistor R2 and the collector-emitter path of the now conductive transistor T1. This is kept so small by the dimensioning of the resistor R2 that it is practically negligible. In the case of the embodiments shown in FIGS. 5 to 7, the residual current is kept particularly small compared with the embodiments shown in FIGS. 3 and 4 by providing a third transistor T4 for the switching amplifier. This permits the resistance value of the resistor R2 to be increased correspondingly, since the total amplification factor of the switching amplifier is increased and a correspondingly smaller control current is thus required for the switching-on of the switching amplifier.

As is evident from what has been described, the residual voltage, which decays across the switched-on transistor T3 or T4 and charges the capacitor C, is about twice as great as the voltage at which the transistor T1 switches through. The residual voltage must be substantially smaller than the battery voltage so that the light lights up when the transistors T1 and T2 are switched on. In the embodiments shown in FIGS. 1 and 3, in which the switching amplifier is formed by a Darlington amplifier, the control current flowing through the resistor R2 must switch on the transistors T2 and T3, the base-emitter paths of which are in series. Correspondingly, the saturation voltage of the transistor T3 must be taken into account. It results from this that the residual voltage of the switching amplifier, which decays at the collector-emitter path of its last transistor T3 or T4 in the switched-on state, is approximately 1.6 volts. In the case of the embodiments shown in FIGS. 4 to 7, the residual voltage is reduced substantially in comparison therewith, since merely the base-emitter path of the transmitter T2 is in series with the resistor R2, wherein the switching amplifier operates with complimentary transistors T2, T3, or T4. The residual voltage in this case amounts to approximately 1 volt. This has the advantage that during the delay time, i.e. when the current feeding the light does not flow through the door contacts 4, but through the collector-emitter path of the transistor T3 or T4, a small voltage decays at this collector-emitter path and does not lead to a substantial reduction of the illumination intensity of the light. The Zener voltage of the Zener diode Z1 is such that it is greater than the residual voltage of the switching amplifier, but smaller than the voltage of the battery of the motor vehicle. If one assumes the usual battery voltage of a battery of a passenger motor vehicle of 12 volts, then a Zener voltage value of 4.7 volts is suitable.

Through the Zener diode Z1 in FIGS. 3 to 7, the following is additionally attained:

As described, the end of the time delay is determined by the charging-up of the capacitor C through the resistor R1. This charging process follows a known exponential function. An exact switching point is obtained only with difficulty, so that in practice a very protracted transition takes place between the two switching states of the transistor T3 or T4 or the light source 2. This has the disadvantage, in particular, that the transistor T3 or T4 would actually have to be designed for a high loss load. The provision of the Zener diode Z1 however leads to a further charging current component for the capacitor C, above the Zener voltage, in addition to the charging current for the capacitor C flowing through the resistor R1. The charging process is thus accelerated by the Zener diode Z1, wherein the charging current component flowing through the Zener diode Z1 exhibits a tendency to increase up to the switching-of the transistor T1. In correspondence therewith, the transistor T3 or T4 is then switched on suddenly so that it need be dimensioned only for a smaller loss load. Also, in practice the light source 2 switches off suddenly at the end of the delay time.

As is evident from the above-described manner of operation, the transistor T3 or T4 in the normal case need be designed only for that current which flows through the incandescent lamp 2 when this is already lit up, for which the resistance value of the incandescent lamp 2 is, as is known, substantially greater in the warm state, thus during lighting, than in the cold state. Some cases of use can however arise with the delay circuit, in which the transistor T3 or T4 would have to conduct a substantially greater current than corresponds to the warm resistance value of the lit incandescent lamp. For example, it is to be taken into consideration that the manual switch 3 of the interior light can be closed during installation of the delay circuit into the motor vehicle, that the delay circuit can be wrongly incorporated in the motor vehicle, that the battery of the motor vehicle must be refitted or that the incandescent lamp 2 has a short circuit. This would have the consequence that a current, which is substantially higher than the current flowing in the normal case, would flow through the delay circuit. In such cases, the capacitor C is charged up very rapidly in a few micro-seconds through the Zener diode Z1 and the switching amplifier T2 and T3 or T2, T3 and T4 thereby blocked. The transistors thereof thus need not be dimensioned for extremes of operation.

It is furthermore to be taken into consideration that appreciable voltage peaks can arise in the electrical network of the motor vehicle. These can reach up to 150 volts. Such possible voltage peaks endanger the transistors. It is attained particularly through the Zener diode Z1 that particularly high voltage peaks of brief duration lasting for example 2 micro-seconds, are conducted away to the capacitor C.

For further protection against negative overvoltages, the diode D2 is provided in the embodiments shown in FIGS. 3, 4, 6 and 7.

In the embodiment shown in FIG. 5, the diode D2 is replaced by a Zener diode Z2. The Zener diode Z2 suppresses not only negative over-voltages as does the diode D2, but also positive overvoltages lasting a relatively long time, for example, a few milli-seconds. The Zener voltage of the Zener diode Z2 is so chosen that it is greater than the battery voltage, but smaller than the breakdown voltage of the collector-emitter path of the transistor T1 to T4.

In the embodiments shown in FIGS. 4 to 7, a transistor T3 with PNP-semiconductor zone sequence is connected to the transistor T2 with NPN-semiconductor zone sequence. The circuit may also be built up with transistors of reverse semiconductor zone sequences. The chosen designations of the electrodes of the transistors are then correspondingly reversed. The circuits shown in FIGS. 3 to 7 make no special demands on the amplification factors of the transistors nor on their blocking voltages so that the circuits can readily be built up either with cheap transistors or as integrated switching circuits.

In the embodiment shown in FIG. 6, the circuit shown in FIG. 5 is so illustrated that it is suitable for manufacture as an integrated switching circuit IC. The Zener diode Z1 is in that case simulated by a series of the base-emitter paths of transistors T5, T6 and T7 of the integrated circuit IC. Similarly, the Zener diode Z2 is provided by a series connection of the base-emitter paths of transistors T8, T9 and T10, wherein this series circuit takes over the function of the Zener diode Z2 in respect of the suppression of positive voltage peaks. A diode D2 is provided for the suppression of negative voltage peaks. Only the capacitor C need be constructed as separate component element in this switching circuit IC.

Figure 3:
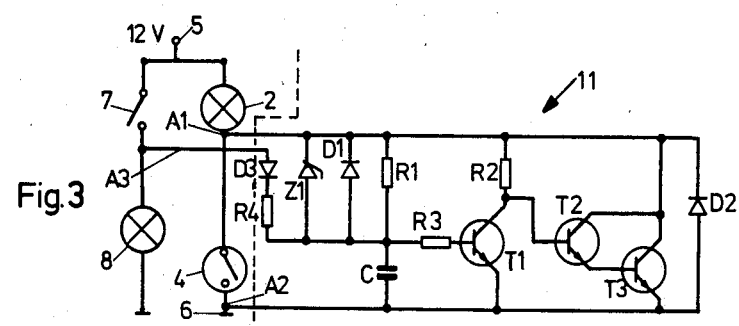
FIG. 3 shows another delay circuit

Additionally illustrated in FIGS. 3 and 7 is a set of switching contacts 7 for a parking light of the vehicle, one incandescent lamp 8 of which is shown. Connected to a circuit connection A3 at the switching contacts 7 or at the incandescent lamp 8 is a circuit branch, the other end of which is connected to the voltage pole of the capacitor C. The circuit branch has a diode D3 and a resistor R4. The diode D3 is so poled that the capacitor C is charged when the switching contacts 7 are closed and thereby the parking light lit up. Thereby, the capacitor C is always kept charged when the headlights of the vehicle are switched on, especially at night so that, the aforedescribed delayed switching-off of the interior light of the motor vehicle does not occur in this case. The interior light is extinguished when the door contacts 4 are opened by closing of the door.

In view of the last-described measure, the length of the delay time can, if so desired, be increased by appropriate dimensioning of the RC-member R1 and C, as this delay time will not occur when the headlights are switched on. It is thereby avoided that the driver before driving-off at night must either wait until the interior light goes out or else drive for a few seconds with the interior light still on.

The circuit branch D3 and R4 is illustrated for simplification only in FIGS. 3 to 7. The circuit branch can also be provided in the embodiments shown in FIGS. 1, 4 5 and 6.

In the embodiment shown in FIG. 7, a series connection of a set of ignition lock contacts 9 and further electrically operated devices 10 of a motor vehicle is illustrated between the voltage pole 5 and the earth pole 6.

The delay circuit 11 is connected through the circuit connections A1, A2, and A3 and a further circuit connection A4 to the power supply of the motor vehicle. The connection A4 is connected between the ignition lock contacts 9 and the devices 10. The delay circuit 11 has a signal transmitter 12, which is shown in the drawing as being acoustical. The signal transmitter 12 can be accommodated in the region of the dashboard of the motor vehicle.

Between the circuit connection A1 and the connection A3 is the series connection of the signal transmitter 12 and the collector-emitter path of the transistor T5, the base of which is connected through a resistor R5 to the circuit connection A3.

Connected in parallel with the base-emitter path of the transistor T5 is the collector-emitter path of the transistor T6, the base of which is connected through a resistor R6 with the circuit connection A4. The detail polarities of the transistors and the directions of the poling of the diodes are shown in FIG. 7.

The circuit shown in FIG. 7 has the following additional functions to that described above:

As long as the ignition lock contacts 9 are closed, the transistor T6 is conductive so that the transistor T5 is blocked. In this case, the signal transmitter 12 cannot deliver a signal while the light switch contacts 7 and door contacts are closed. The transistor T5 is switched on when the light switch contacts 7 and door contacts 4 are closed. In this case, the signal transmitter 12 delivers an alarm tone if the driver after withdrawing the ignition key opens the vehicle door and has forgotten to switch off the external light 8.

If it is accepted that the signal transmitter 12 is always switched on when the light switch contacts 7 and door contacts 4 are closed, the circuit connection A4, the resistor R6 and the transistor T6 can be dispensed with. In cases in which the occurrence of the switching-off delay of the interior light 2 does not depend on the setting of the light switch contacts 7, the circuit branch R4 and T3 can be dispensed with.

I claim:

1. A delay circuit for causing delayed extinguishing of a motor vehicle interior light connected in series with a source of electricity and with a switch in the form of a set of two contacts openable and closable by operation of a door of the vehicle, said circuit comprising:
    (a) a first conductor adapted to be electrically connected to one of said two contacts;
    (b) a second conductor adapted to be electrically connected to the other one of said two contacts;
    (c) electronic switching amplifier means connected between said first and second conductors in parallel with said set of contacts to conduct current for temporary operation of said light after said contacts have been opened;

(d) discriminator stage means connected to said switching amplifier means and so actuable in response to application thereto of a control voltage above a defined threshold value as to effect interruption of said current conduction by said switching amplifier means;

(e) a resistance-capacitance network connected between said first and second conductors in parallel with said set of contacts and coupled to said discriminator stage means to allow application thereto of said control voltage on charging of said capacitance of said network above said threshold value, said network being so coupled to said switching amplifier means that said capacitance of said network is chargeable by the residual voltage at said switching amplifier means when said contacts are opened, said residual voltage having a value which is greater than said threshold value but which is sufficiently small to enable operation of said light by voltage having a value equal to the difference between the value of voltage from said source and the value of said residual voltage; and (f) a Zener diode having a Zener voltage value greater than the value of said residual voltage but smaller than the value of voltage from said source and being connected in parallel with said resistance of said network to cause said capacitance of said network to be additionally charged by current supplied through said Zener diode when subjected to a voltage exceeding said Zener voltage value.

2. A circuit as defined in claim 1, comprising a diode which is so connected between the voltage pole of said capacitance and one of said first and second conductors as to provide a discharge path for said capacitance when said contacts are closed.

3. A circuit as defined in claim 1, wherein said discriminator stage means comprises a transistor having its base-emitter path connected in parallel with said capacitance of said network so that on application of said control voltage said transistor is switched to be conductive, and having its collector connected to a control base of said switching amplifier means so that on switching of said transistor to be conductive said switching amplifier means is switched to be non-conductive, said control base of said switching amplifier means being connected to a resistor for controlling supply thereto from said source of a current sufficient to effect switching of said switching amplifier means to be conductive when said transistor of said discriminator stage means is non-conductive.

4. A circuit as defined in claim 1, comprising an earth terminal connected to support means receiving said circuit.

5. A circuit as defined in claim 2, comprising a further diode or a further Zener diode poled against the forward direction of said switching amplifier means and connected in parallel with output means of said switching amplifier means.

6. A circuit as defined in claim 1, comprising an integrated circuit in which said Zener diode is formed by a series connection of a plurality of base-emitter paths and said capacitance is mounted externally of said integrated circuit.

7. A circuit as defined in claim 2, comprising a third conductor which is arranged to be connected between a light switch contact of said motor vehicle and a further light associated therewith, and a signal transmitter which is connected in series with a switching path of a first electronic switch, said first electronic switch being controlled through said third conductor and said signal transmitter being connected between said first conductor arranged to be connected at said light and said third conductor.

8. A circuit as defined in claim 7, comprising a circuit branch which is connected between said third conductor and said charging capacitor and which is provided with a resistor and a further diode and through which said capacitance is arranged to be charged.

9. A circuit as defined in claim 7, comprising a fourth conductor which is arranged to be connected to an ignition lock of said motor vehicle, a second electronic switch being connected between said fourth conductor and said first conductor so as to be controlled through said fourth conductor and to control said first electronic switch, said first and second electronic switches comprising transistors, said first electronic switch having a collector-emitter path which is connected in series with said signal transmitter, said second electronic switch having a collector-emitter path which is connected in parallel with the base-emitter path of said first electronic switch, said first electronic switch being connected through a further resistor at said third conductor and the base of said second electronic switch being connected through a still further resistor at said fourth conductor.

* * * * *